US006894697B2

(12) United States Patent
Matsuda

(10) Patent No.: US 6,894,697 B2
(45) Date of Patent: May 17, 2005

(54) ENVIRONMENT-COMPLIANT IMAGE DISPLAY SYSTEM AND PROGRAM

(75) Inventor: Hideki Matsuda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 09/916,677

(22) Filed: Jul. 30, 2001

(65) Prior Publication Data

US 2002/0048084 A1 Apr. 25, 2002

(30) Foreign Application Priority Data

Jul. 31, 2000 (JP) ........................................ 2000-230950

(51) Int. Cl.$^7$ ................................................ G09G 5/02
(52) U.S. Cl. ......................... 345/589; 345/602; 345/77
(58) Field of Search ................................ 345/589, 590, 345/602, 207, 77, 600, 74.1; 348/603

(56) References Cited

U.S. PATENT DOCUMENTS

| | | | | |
|---|---|---|---|---|
| 4,952,917 | A | | 8/1990 | Yabuuchi ..................... 345/589 |
| 5,287,173 | A | * | 2/1994 | Onuma et al. ............... 348/655 |
| 5,488,434 | A | | 1/1996 | Jung .......................... 348/603 |
| 5,561,459 | A | | 10/1996 | Stokes et al. |
| 5,739,809 | A | | 4/1998 | McLaughlin et al. |
| 5,760,843 | A | | 6/1998 | Morimura et al. .......... 348/603 |

FOREIGN PATENT DOCUMENTS

| | | |
|---|---|---|
| EP | 0 700 218 A2 | 3/1996 |
| GB | 2 335 326 A | 9/1999 |
| GB | 2 341 033 A | 3/2000 |
| JP | 59-066280 | 4/1984 |
| JP | A 4-53374 | 2/1992 |
| JP | 04-127667 | 4/1992 |
| JP | 05-100652 | 4/1993 |
| JP | 06-178244 | 6/1994 |
| JP | 07-095558 | 4/1995 |
| JP | 09-018806 | 1/1997 |
| JP | A 09-107484 | 4/1997 |
| JP | 09-149337 | 6/1997 |
| JP | A 10-65930 | 3/1998 |
| JP | 10-062865 | 3/1998 |
| JP | A 10-105145 | 4/1998 |
| JP | A 10-304395 | 11/1998 |
| JP | A 11-041478 | 2/1999 |
| JP | A 11-085952 | 3/1999 |
| JP | A 11-175048 | 7/1999 |
| WO | WO 94/18790 | 8/1994 |

OTHER PUBLICATIONS

EP 1251482A2*
New U.S. Application, filed Jul. 30, 2001, inventor Matsuda.

* cited by examiner

Primary Examiner—Matthew Luu
(74) Attorney, Agent, or Firm—Oliff & Berridge PLC

(57) ABSTRACT

To provide an environment-compliant image display system and program, the system is provided with an environmental correction processing section for correcting an LUT in a 3D-LUT storage section, thus correcting colors, and a γ correction section for correcting γ values in a 1D-LUT storage section, thus correcting brightness, based on environmental information that has been measured by a colored-light sensor.

17 Claims, 4 Drawing Sheets

ENVIRONMENT-COMPLIANT IMAGE DISPLAY SYSTEM AND PROGRAM

Japanese Patent Application No. 2000-230950, filed on Jul. 31, 2000, is hereby incorporated by reference in its entirety.

1. Field of the Invention

The present invention relates to an environment-compliant image display system and program.

2. Background of the Invention

When displaying images at a plurality of different locations (in presentations, meetings, medical treatments, the design and fashion field, business activities, education, as well as general-purpose images such as those in movies, TV, video, and games), an important part of achieving effective presentations is to make it possible to reproduce images exactly as the creator of those images intended, whatever the location.

One way of considering how to adjust the viewing of such images is management of the input-output characteristics of the device to achieve color management in the reproduction of colors. Specific methods of how to achieve this are not, however, clear.

When projecting and displaying an image with a projector and screen, in particular, it is difficult to reproduce colors in a suitable manner without considering not only ambient light but also the screen type.

Recent advances in increasing resolution of projectors have made color reproducibility important as well.

In a prior-art projector, a one-dimensional look-up table (1D-LUT) is used with the objective of providing refinements such as color temperature adjustment, γ correction, and correction of the characteristics of the display elements.

To achieve high-quality color management, however, it is necessary to aim for consistency of reproducible color gamut between other display devices having different reproducible color gamuts and a standard color space (sRGB, for example).

It is also necessary to match the reproducible color gamut of a display device that has been affected by its environment with the reproducible color gamut of other display devices or the standard color space. To achieve such matching of the reproducible color gamut, corrections called color compression and color expansion are applied.

When it comes to matching two reproducible color gamuts, a part of one reproducible color gamut projects from the other reproducible color gamut, and another part of the one reproducible color gamut is within the range of the other reproducible color gamut. For that reason, it is necessary to perform corrections that apply compression to a specific color range or expansion to another specific color range, within the same reproducible color gamut.

It is difficult to implement such color control over specific range by using 1D-LUTs to control the gamma values of each RGB color. Even though a 1D-LUT is a mapping table, it can only control primary colors and it is difficult to apply different levels of control for each color.

SUMMARY

The present invention was devised in the light of the above-described technical problem and has as an objective thereof the provision of an environment-compliant image display system and program that make it possible to reproduce substantially the same colors rapidly at a plurality of different locations.

(1) In order to solve the above described technical problem, a first aspect of the present invention relates to an environment-compliant image display system which corrects an image based on environmental information expressing a visual environment in an area in which the image is displayed, and displays the image, the environment-compliant image display system comprising:

means for storing brightness correction information for correcting brightness of the image, based on the environmental information, and color correction information for correcting color of the image, based on the environmental information; and correction means for correcting image information for displaying the image, based on the environmental information, the brightness correction information, and the color correction information.

(2) A second aspect of the present invention relates to an environment-compliant image display system which corrects an image based on environmental information expressing a visual environment in an area in which the image is displayed, and displays the image, the environment-compliant image display system comprising:

a storage section which stores brightness correction information for correcting brightness of the image, based on the environmental information, and color correction information for correcting color of the image, based on the environmental information; and a correction section which corrects image information for displaying the image, based on the environmental information, the brightness correction information, and the color correction information.

(3) A third aspect of the present invention relates to a program embodied on an information storage medium or in a carrier wave which corrects an image based on environmental information expressing a visual environment in an area in which the image is displayed, and displays the image, the program being for a computer to realize:

means for a predetermined storage area to store brightness correction information for correcting brightness of the image, based on the environmental information, and color correction information for correcting color of the image, based on the environmental information; and correction means for correcting image information for displaying the image, based on the environmental information, the brightness correction information, and the color correction information.

These aspects of the present invention make it possible to adjust brightness and color in a more flexible manner, by separating brightness correction information and color correction information for management, while correcting an image by using environmental information.

In the prior art, a one-dimensional look-up table (1D-LUT) is used with the objective of providing refinements such as color temperature adjustment, γ correction, and correction of the characteristics of the display elements, by way of example.

To achieve high-quality color management, however, it is necessary to aim for consistency of reproducible color gamut between other display devices having different reproducible color gamuts and a standard color space (sRGB, for example).

It is also necessary to match the reproducible color gamut of a display device that has been affected by its environment with the reproducible color gamut of other display devices or the standard color space. To achieve such matching of the reproducible color gamut, corrections called color compression and color expansion are applied.

When it comes to matching two reproducible color gamuts, a part of one reproducible color gamut projects from the other reproducible color gamut, and another part of the one reproducible color gamut is within the range of the other reproducible color gamut. For that reason, it is necessary to perform corrections that apply compression to a specific color range or expansion to another specific color range, within the same reproducible color gamut.

It is difficult to implement such color control over specific range by using 1D-LUTs to control the gamma values of each RGB color. Even though a 1D-LUT is a mapping table, it can only control primary colors and it is difficult to apply different levels of control for each color. On the other hand, a three-dimensional look-up table (3D-LUT) makes it possible to control each color, even if they are not primary colors, which enables variable control (color compression and color expansion) for each range of color such as those described above.

The use of a 3D-LUT makes it possible to control features such as variable color compression and color expansion for each range of color, which is difficult with a 1D-LUT, thus enabling accurate color reproduction.

In this manner, it is possible to achieve suitable color reproduction by managing a 1D-LUT for brightness correction independently of a 3D-LUT for color correction.

This makes it possible to absorb differences between display environments and thus display the same image regardless of the environment to which it is applied. It is therefore possible to reproduce substantially the same colors in a plurality of different locations, within a short time.

Note that "visual environment" in this case refers to factors such as ambient light (such as artificial light, natural light) and the object on which the image is displayed (such as display device, wall surface, screen).

This environmental information could be values that indicate color and brightness, such as xyY, or color and brightness correction amounts, such as $\Delta x \Delta y \Delta Y$.

When implementing such an image display system, it is possible to do so by using means such as a projector or monitor.

(4) In this image display system and program, the brightness correction information may comprise a one-dimensional look-up table, and the color correction information may comprise a three-dimensional look-up table.

Similarly, the one-dimensional look-up table may comprise at least one of a gamma table and a color balance table, and the three-dimensional look-up table may comprise at least one of a color gamut correction table and a color temperature correction table.

(5) In this image display system and program, the correction means may comprise means for collecting a plurality of types of environmental information that is input thereto all together, and may correct the image information based on the collected environmental information.

Even when a plurality of types of environmental information is input, this ensures that subsequent correction processing can be performed rapidly by collecting these types.

In such a case, information in a form such as xyY, Luv, Lab, or XYZ can be used as the information after the collection.

(6) In this image display system and program, the correction means may modify a predetermined correction coefficient that is used in a correction of the image information, based on the environmental information.

This makes it possible to reproduce colors in a manner to suit the actual visual environment, by taking default correction coefficients that have been set by the manufacturer and varying them in accordance with target colors, by way of example.

(7) This image display system may comprise visual environment detection means for measuring at least one of the color value, gamma, and color temperature of an image that is displayed in the image-displayed area.

(8) In this program, the environmental information may be information from a visual environment detection means for measuring at least one of the color value, gamma, and color temperature of an image that is displayed in the image-displayed area.

Note that this visual environment detection means could be one or a combination of several different devices, such as a luminance sensor that measures the luminance value of the image-displayed area, a colored-light sensor that measures the RGB values or XYZ values of the image-displayed area, or a chromaticity sensor that measures the chromaticity values of the image-displayed area.

In this case, "color values" refers to indices that express colors by factors such as tri-stimulus values, chromaticity coordinates, spectrum distribution, excitation purity, or main wavelength.

(9) In this image display system and program, the image-displayed area may be an area on a screen.

This image display system can be applied in a satisfactory manner even when the way in which colors are seen is greatly changed by materials such as the screen.

This image display system may comprise:

means for displaying an image that guides to input a type of the screen; and means for inputting the input type of the screen as at least part of the environmental information.

This program may be for a computer to realize:

means for a display means to display an image that guides to input a type of the screen; and means for an input means to input the input type of the screen as at least part of the environmental information.

This makes it possible to correct the colors and brightness of an image in a suitable manner, by determining the visual environment of the screen in a manner that cannot be considered in the prior art.

In particular, since there is only a small number of screen types and people can easily distinguish between them, there is little likelihood of a decision error during input of this screen type and thus it is possible to determine the screen type accurately.

Note that this screen could be of a reflective type or a transparent type.

The visual environment detection means may determine the visual environment with reference to the screen type.

This visual environment detection means could comprise a sensor that determines the screen characteristics, by way of example.

More specifically, the screen characteristics could be determined by using a sensor such as a colored-light sensor to measure reflected light (passed light) when a white light is projected.

This makes it possible to determine the visual environment in light of the screen type, and also absorb differences in screen type by applying correction such as gamma correction or color temperature correction that is based on the result of this determination. It is thus possible to reproduce the same image with colors that are independent of the screen type.

With PCs or the like that use operating systems with internal prior-art color management systems, in particular, the only consideration is the type of display connected to the PC. In addition, methods of performing color correction from consideration of ambient light have been proposed, but there is nothing that considers the screen that forms the area in which the image is displayed.

The present invention makes it possible to create and display images that reflect the visual environment in a suitable manner, by applying color correction after determining the visual environment with reference to the screen type.

In this image display system, the visual environment detection means could also comprise means for determining the visual environment by measuring at least ambient light.

Similarly, the program could also ensure that the visual environment detection means determines the visual environment by measuring at least ambient light.

This makes it possible to determine the visual environment by a method such as measuring the ambient light. Ambient light within the visual environment has a huge effect on the way in which an image is seen. The visual environment can be determined in a suitable manner by measuring the ambient light which is a major factor in how an image is seen.

DETAILED DESCRIPTION

The description below relates to a case in which the present invention is applied to an image display system which uses a liquid-crystal projector and which can adapt to the environment, by way of example, with reference to the accompanying figures.

Description of Overall System

Figure 1:
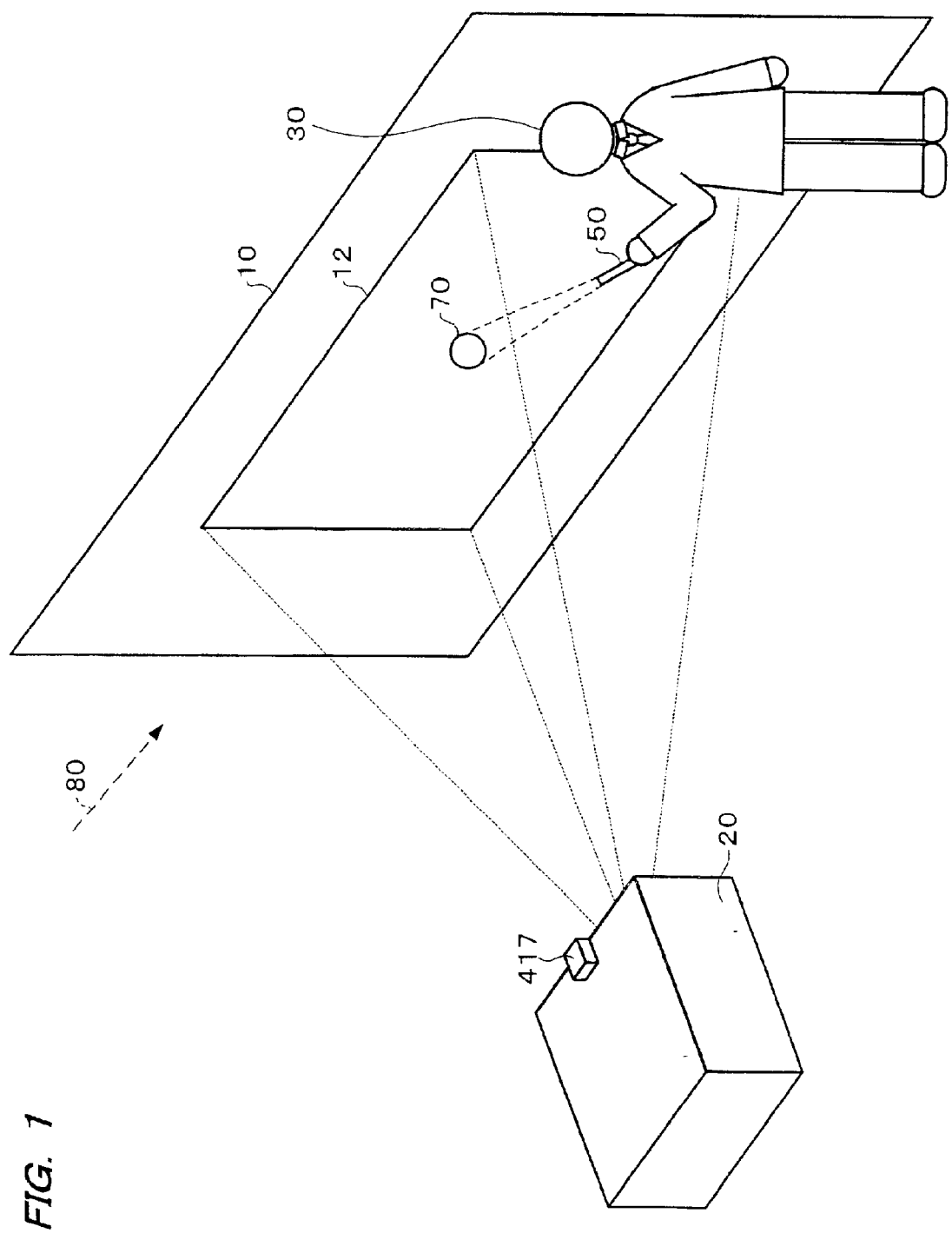
FIG. 1 is a schematic illustrative view of a presentation system that uses a laser pointer in accordance with an example of this embodiment of the present invention.

A schematic illustrative view shown in FIG. 1 is of a presentation system that makes use of a laser pointer 50, in accordance with an example of this embodiment of the present invention.

A projector 20 that is provided substantially facing a screen 10 projects an image for a predetermined presentation. A presenter 30 gives a presentation to an audience, while using a light spot 70 projected from the laser pointer 50 to point at a desired position of an image in an image display region 12, which is a image-displayed area on the screen.

During such a presentation, the way in which images on the image display region 12 are seen will vary greatly, depending on factors such as the type of the screen 10 and ambient light 80. When the same white is displayed, for example, it could seem to be white with a yellow cast or white with a blue cast, depending on the type of the screen 10. Even when the same white is displayed, it could seem to be a bright white or a dull white if the ambient light 80 differs.

Recently, the projector 20 has become smaller and easy to transport. For that reason, it has become possible to perform presentations at a client's location, by way of example, but it is difficult to adjust colors to match the environment at the client's location and the manual adjustment of colors at the client's location takes too much time.

Figure 2:
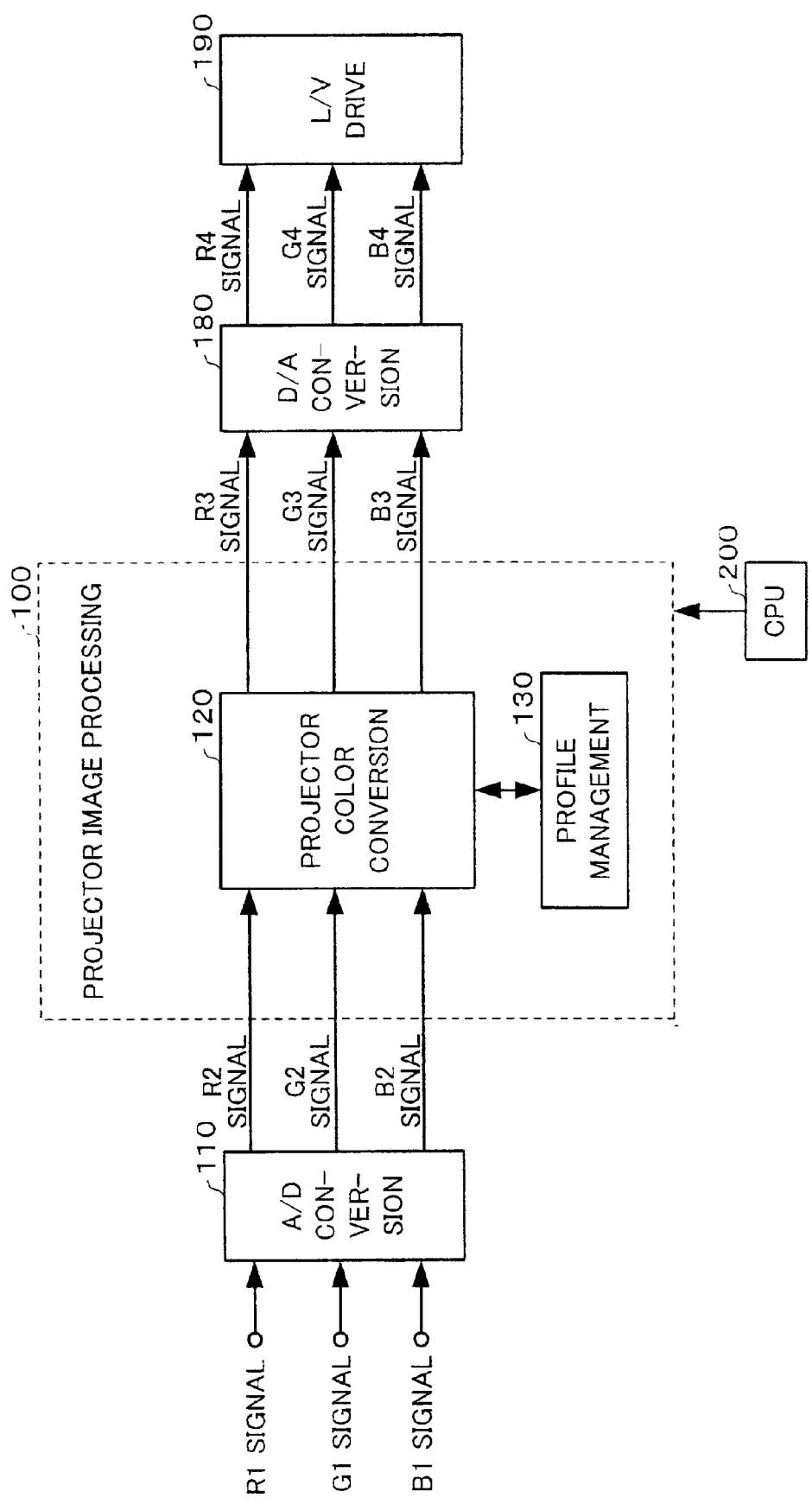
FIG. 2 is a functional block diagram of the image processing section within a prior-art projector.

A functional block diagram of the image processing section within a prior-art projector is shown in FIG. 2.

This prior-art projector inputs an R1 signal, a G1 signal, and a B1 signal (which for RGB signals in analog format, sent from a PC or the like) to an A/D conversion section 110, and uses a projector image processing section 100 to perform color modification on an R2 signal, a G2 signal, and a B2 signal which have been converted into digital form by the A/D conversion section 110.

A D/A conversion section 180 converts an R3 signal, a G3 signal, and a B3 signal, which have been subjected to the color modification of the projector image processing section 100, into analog form and outputs them as an R4 signal, a G4 signal, and a B4 signal. A light valve (L/V) drive section 190 drives liquid-crystal light bulbs to display an image, based on the R4 signal G4 signal, and B4 signal.

The projector image processing section 100, which is controlled by a CPU 200, comprises a projector color conversion section 120 and a profile management section 130.

The projector color conversion section 120 converts the RGB digital signals (the R2 signal, G2 signal, and B2 signal) into RGB digital signals for projector output (the R3 signal, G3 signal, and B3 signal), based on a projector input-output profile that is managed by the profile management section 130. Note that "profile" in this case refers to characteristic data.

In this manner, the prior-art projector can only perform color modification based on an input-output profile that indicates input-output characteristics that are specific to that particular projector, so no consideration is paid to the visual environment in which the image is projected and displayed.

However, it is difficult to make the way in which colors are seen uniform in this manner, without taking the visual environment into account. The way in which colors are seen is determined by three factors: light, the reflection or transmission of light by objects, and vision.

This embodiment of the present invention implements an image display system that can reproduce an image with the same visual appearance, by determining the visual environment of light and the reflection or transmission of light by objects, irrespective of the environment in which it is applied.

More specifically, the device is provided with a colored-light sensor 417 that functions as visual environment detection means for determining the visual environment, as shown in FIG. 1, and environmental information from the colored-light sensor 417 is input to the projector 20. To be more specific, the colored-light sensor 417 measures colored-light information (more specifically, information indicating xyY colors and brightness) of the image display region 12 within the screen 10.

The projector 20 is provided with color control processing means that stores and manages brightness correction information, for correcting the brightness of the image based on this environmental information, and color correction information, for correcting the colors of the image based on this environmental information, and correction means that corrects the image information for displaying the image, based on the environmental information, the brightness correction information, and the color correction information.

The description now turns to the function blocks of the image processing section of the projector 20, which comprises this color control processing means and this correction means.

Figure 3:
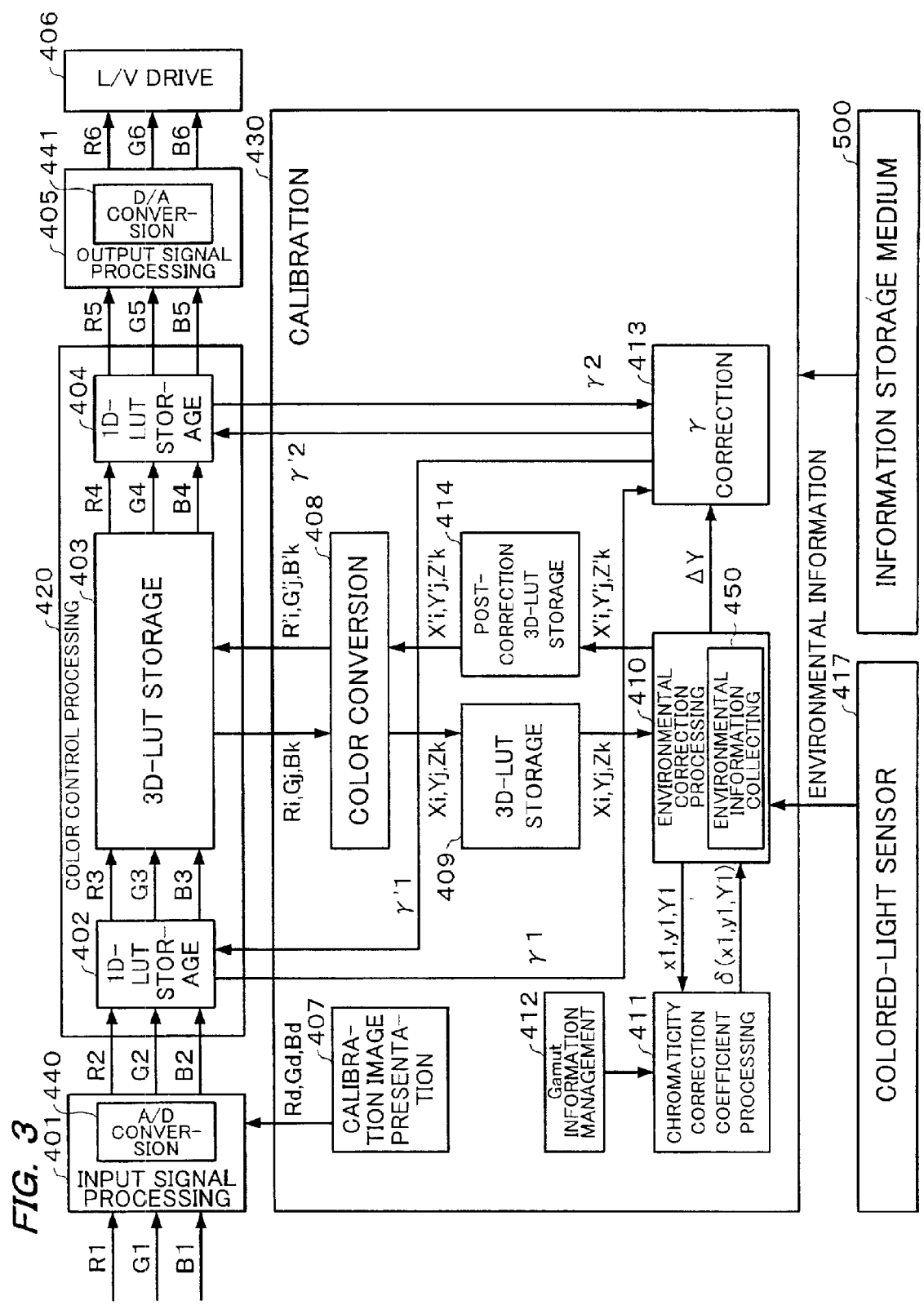
FIG. 3 is a functional block diagram of the image processing section within a projector in accordance with an example of this embodiment of the present invention.

A functional block diagram of the image processing section within the projector 20 in accordance with an example of this embodiment of the invention is shown in FIG. 3.

The image processing section comprises an input signal processing section 401 to which RGB signals are input, a color control processing section 420, a calibration section 430 that functions as correction means, an output signal processing section 405, and an L/V drive section 406.

The input signal processing section 401 comprises an A/D conversion section 440 that converts the R1, G1, and B1 analog image signals into the R2, G2, and B2 digital image signals.

The color control processing section 420 comprises a one-dimensional look-up table (1D-LUT) 402 for input signal processing, a three-dimensional look-up table (3D-LUT) storage section 403 that is used in correcting the color information, and a 1D-LUT storage section 404 that is used in correcting the brightness information.

Note that a gamma table and color balance table (or just one of them) are stored as part of the brightness correction information in the 1D-LUT storage sections 402 and 404. Similarly, a color gamut correction table and a color temperature correction table (or just one of them) are stored as part of the color correction information in the 3D-LUT storage section 403.

In the art, color control is done with a 1D-LUT and brightness correction is done by determining what potential is used when sampling the input signal.

During the correction of the brightness of colors to be reproduced, it is necessary to boost the output of lower-range grayscale. In this case, brightness correction is performed by a 1D-LUT that can manipulate a grayscale characteristic.

As previously described, color correction is done with a 3D-LUT, to ensure appropriate color compression or color expansion for each color when it comes to matching other reproducible color gamuts by color control.

In this manner, brightness and color can be corrected separately, based on environmental information relating to brightness and environmental information relating to color, making it possible to perform each type of correction more precisely.

The description now turns to color correction, which will be followed by a description of brightness correction.

Color Correction

The calibration section 430 comprises a calibration image presentation section 407 which inputs image signals for calibration (correction) to the input signal processing section 401, a color conversion section 408 which converts colors for conversion (stored in the 3D-LUT storage section 403) from the RGB color system into the XYZ color system, and an environmental correction processing section 410 which performs color and brightness correction, based on environmental information that is input from the colored-light sensor 417.

Note that the RGB system results in device-dependent colors that vary with the input-output device, such as a projector, but the XYZ system results in non-device-dependent colors.

The calibration section 430 comprises a Gamut information management section 412 and a chromaticity correction coefficient processing section 411.

The Gamut information management section 412 manages the color gamut information of the image to be depicted. The color gamut information is supplied to the chromaticity correction coefficient processing section 411 and used in the derivation of chromaticity correction coefficients $\delta$.

The chromaticity correction coefficient processing section 411 draws a plurality of similarly-shaped triangles of the reproducible color gamut, based on the RGB colors from the Gamut information management section 412. The chromaticity correction coefficient processing section 411 derives chromaticity correction coefficients (such as $\delta(x1, y1, Y1)$) that are based on color information (such as x1, y1, Y1) from the environmental correction processing section 410.

Figure 4:
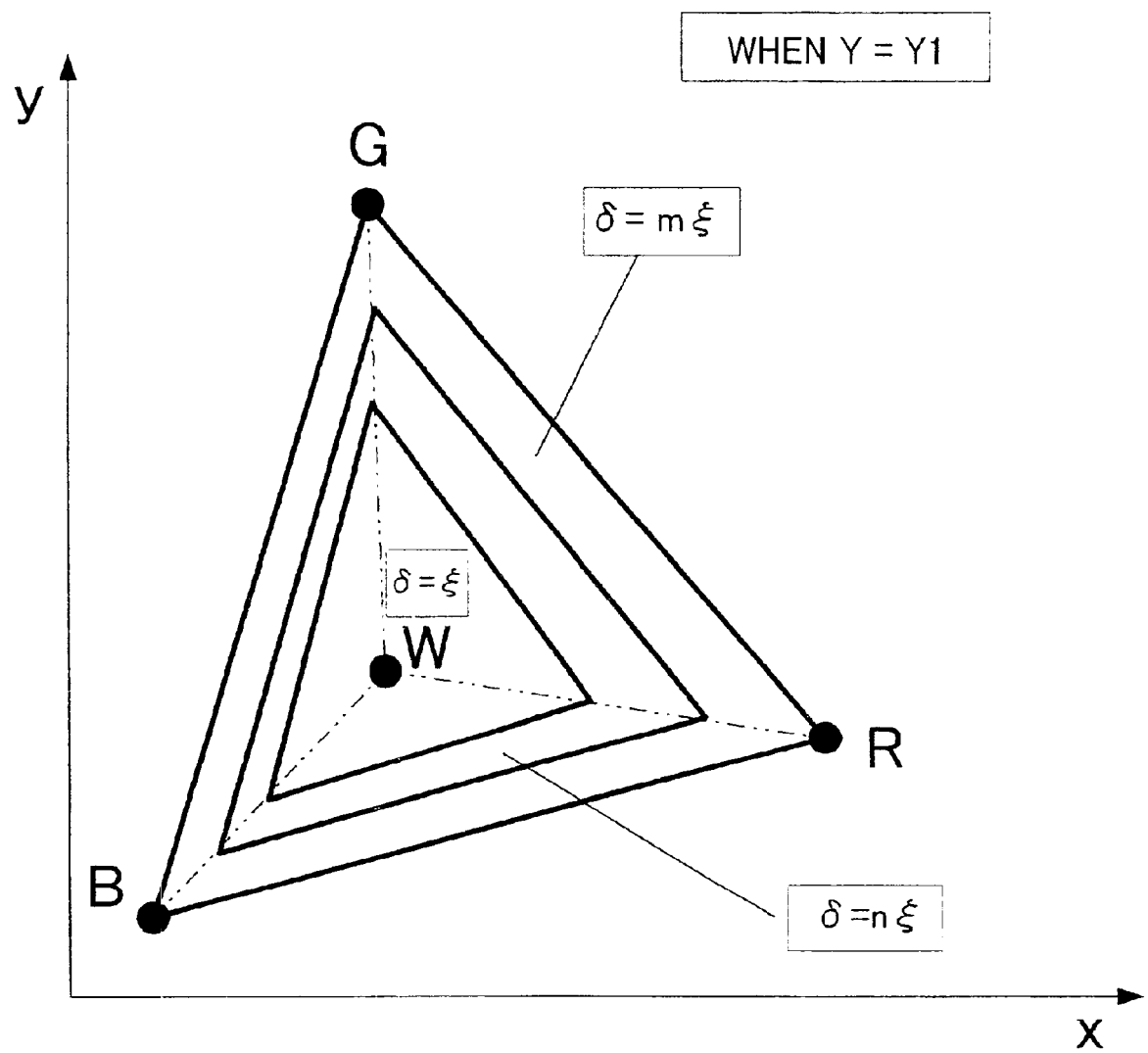
FIG. 4 shows an example of the method of deriving the chromaticity correction coefficients δ when Y=Y1.

An example of the method of deriving the chromaticity correction coefficients $\delta$ when Y=Y1 is shown in FIG. 4.

When RGBW (where W means white (or gray)) color triangles are drawn on an xy chromaticity chart, the result is as shown in FIG. 4, by way of example.

The chromaticity correction coefficient processing section 411 assumes that the chromaticity correction coefficient for the color of the range between the outermost triangle and the one within it (the center triangle) is $\delta=m\xi$. Similarly, it assumes that the chromaticity correction coefficient for the color of the range between the center triangle and the innermost triangular is $\delta=n\xi$. In this case, m and n are coefficients. It also assumes that the chromaticity correction coefficient for the color of the range within the innermost triangle is $\delta=\xi$.

Thus the chromaticity correction coefficient processing section 411 obtains chromaticity correction coefficients ($\delta(x1, y1, Y1)$) relating to the color information (x1, y1, Y1) that is input from the input signal processing section 401, and outputs those chromaticity correction coefficients to the environmental correction processing section 410.

It is therefore possible to reproduce colors suitably (perform color correction), by modifying the chromaticity correction coefficients in accordance with the input colors.

The environmental correction processing section 410 also inputs environmental information from the colored-light sensor 417.

The colored-light sensor 417 functions as a visual environment detection means that determines the visual environment. The colored-light sensor 417 could be one or a combination of several different devices, such as a luminance sensor that measures the luminance value of the image-displayed area, a colored-light sensor that measures the RGB values or XYZ values of the image-displayed area, or a chromaticity sensor that measures the chromaticity values of the image-displayed area.

In other words, the environmental correction processing section 410 could also input a plurality of items of environmental information from the colored-light sensor 417. In such a case, the environmental correction processing section 410 would have to perform weighting in accordance with the input environmental information (such as weighting of luminance, color temperature, and color information).

To reduce the processing load due to such weighting, the environmental correction processing section 410 is provided with an environmental information collecting section 450 that collects a plurality of items of environmental information all together.

The environmental information collecting section 450 performs predetermined processing on a plurality of items of environmental information to obtain a single of environmental information.

Since it is possible to express color temperature and correlated color temperature in chromaticity coordinates (x, y), these can be collected as xyX.

The following equations can be applied as a more specific example of the collection for a single item of environmental information, by way of example.

$$\Delta x = a_1 x_1 + a_2 x_2 + \ldots + a_p x_p$$

$$\Delta y = a_1 y_1 + a_2 y_2 + \ldots + a_q y_q$$

$$\Delta y = b_1 Y_1 + b_2 Y_2 + \ldots + b_r Y_r$$

In this case, a and b are the previously described weighting coefficients. In this manner, weighting can be done in a collected manner to derive coordinated correction requests Δx, Δy, and ΔY that are necessary for correcting for various environmental influences. The subsequent circuitry can perform the necessary corrections in a simple manner, by using Δx, Δy, and ΔY. Note that Δx, Δy, and ΔY in this case are derived from a comparison with environmental information for an ideal state.

The environmental correction processing section 410 performs color correction by using the color information (Δx, Δy) from within the collected environmental information.

More specifically, the environmental correction processing section 410 performs the processing described below upon color information (such as X1, Y1, and Z1) from a 3D-LUT storage section 409, in order to overwrite corresponding colors of the 3D-LUT storage section 403.

First of all, the environmental correction processing section 410 performs the following calculations to obtain chromaticity coordinates (x1, y1):

$$x1=X1/(X1+Y1+Z1)$$

$$y1=Y1/(X1+Y1+Z1)$$

The environmental correction processing section 410 then outputs color information (x1, y1, Y1) to the chromaticity correction coefficient processing section 411 and inputs chromaticity correction information (δ(x1, y1, Y1)) from the chromaticity correction coefficient processing section 411.

The environmental correction processing section 410 obtains chromaticity (x2, y2) based on environmental information (Δx, Δy), chromatic correction information (δ) that has been collected by the environmental information collecting section 450, and chromaticity (x1, y1). More specifically, following equations could be used for the conversion, by way of example:

$$x2=Kx(x1, \Delta x, \delta)$$

$$y2=Ky(y1, \Delta y, \delta)$$

$$z2=1\cdot x2-y2$$

$$X'1=x2(X1+Y1+Z1)$$

$$Y'1=y2(X1+Y1+Z1)$$

$$Z'1=z2(X1+Y1+Z1)$$

The environmental correction processing section 410 outputs the thus-obtained tri-stimulus values (X'1, Y'1, Z'1) to a post-correction 3D-LUT storage section 414.

The color conversion section 408 converts the (X'1, Y'1, Z'1) values in the post-correction 3D-LUT storage section 414 into (R'1, G'1, B'1) values, then outputs the converted (R'1, G'1, B'1) values to the 3D-LUT storage section 403.

In the 3D-LUT storage section 403, the colors at the mapping destination of the 3D-LUT are overwritten by using (R'1, G'1, and B'1).

In this manner, it is possible to reproduce colors to suit the visual environment, by overwriting the colors of the 3D-LUT in the 3D-LUT storage section 403, based on the visual environment.

Brightness Correction

The description now turns to brightness correction.

This brightness correction is mainly done by correcting the γ values in each 1D-LUT stored in the 1D-LUT storage section 402 and the 1D-LUT storage section 404, by γ correction section 413.

The γ correction parameter ΔY that was obtained by the environmental correction processing section 410, using the above described method, is input by the environmental correction processing section 410 to the γ correction section 413.

The γ correction section 413 performs γ correction processing based on ΔY from the environmental correction processing section 410, to convert γ of the 1D-LUT storage section 402 into γ1' and γ2 of the 1D-LUT storage section 404 into γ2'.

In this manner, it is possible to reproduce brightness to suit the visual environment, by overwriting the 1D-LUTs of the 1D-LUT storage sections 402 and 404, based on the visual environment.

The output signal processing section 405 inputs image signals (R5, G5, and B5) that have been adjusted by using the look-up tables (LUTs) that have been subjected to brightness correction by the 1D-LUT storage sections 402 and 404 and color correction by the 3D-LUT storage section 403.

The output signal processing section 405 uses a D/A conversion section 441 to convert the digital image signals (R5, G5, and B5) into analog image signals (R6, G6, and B6), then outputs the converted analog image signals to the L/V drive section 406.

The L/V drive section 406 uses those analog image signals to drive liquid-crystal light bulbs to regulate the image projected from the projector 20.

In this above described manner, the way in which the image is seen in the image display region 12 of the screen 10 can be adjusted as appropriate by adjusting the image projected by the projector 20.

This embodiment of the present invention therefore ensures that the projector 20 takes the visual environment into consideration when projecting and displaying an image.

This makes it possible for the projector 20 to absorb differences between display environments and thus display the same image regardless of the environment in which it is used. This embodiment of the present invention therefore enables the reproduction of substantially the same colors within a short time, in a plurality of different locations.

The projector 20 can also boost the output of lower-range grayscale and correct the brightness of the reproduced colors by using a 1D-LUT that enables manipulation of the grayscale characteristic during the brightness correction.

The projector 20 can also apply color compression and color expansion independently for each color, by using a 3D-LUT for the color correction.

In this manner, the projector 20 can apply brightness correction and color correction separately, based on environmental information relating to brightness and environmental information relating to color, thus enabling it to apply both types of correction more precisely.

Description of Hardware

Note that the various means described below could be applied as hardware to be used in the previously described components.

For example, the input signal processing section 401 could be implemented by using an A/D converter or the like, the color control processing section 420 could be implemented by using RAM or a CPU or the like, the output signal processing section 405 could be implemented by using a D/A converter or the like, the L/V drive section 406 could be implemented by using a liquid-crystal light bulb driver or the like, and the calibration section 430 could be implemented by using an image processing circuit or the like. Note that these components could be implemented by hardware such as circuitry, or by software such as drivers.

The functions of these components could also be implemented by the reading of information from an information storage medium 500. Means such as a CD-ROM, DVD-ROM, ROM, RAM, or hard disk can be used as the information storage medium 500, and either a direct method or an indirect method could be used for reading that information.

Instead of the information storage medium 500, it is also possible to implement the above described functions by downloading a program for implementing those functions from a host device or the like, through a transfer path. In other words, a program or the like for implementing the above described functions could be embodied over carrier waves.

The present invention has been described above by way of an ideal embodiment thereof but the application of the present invention is not limited to that embodiment.

Modifications

The LUTs stored in the previously described 1D-LUT storage sections 402 and 404 could provide values that are scattered, such as in a mapping table form, or they could provide continuous values, such as those derived from functions.

Note that if values are in a dispersed form, such as in a mapping table, substantially continuous values (corresponding colors) can be obtained by interpolation using a method such as Lagrange interpolation or linear interpolation.

In the embodiment of the present invention described above, the colored-light sensor 417 was used as the visual environment detection means by way of example, but an input means that inputs at least some part of the environmental information (such as the presence/absence of external light, the illumination type, or the screen type) or an image display means that displays an image for prompting the input of such details could be used therefor. Both the colored-light sensor 417 and means for displaying a screen-type input image for acquiring information such as the screen type could be used together as the visual environment detection means.

With a screen, in particular, it is easy for people to distinguish the type of the screen easily, so it is possible to use the above described image display means to show choices for selecting the screen type, thus making it possible to reproduce colors with accurate consideration of the screen type.

In this case, the visual environment determined by the visual environment detection means applies to factors such as ambient light (such as artificial light or natural light) and the object on which the image is displayed (such as a display, wall surface, or screen).

In particular, this embodiment of the present invention makes it possible to apply more appropriate image correction by obtaining information on a component that is not much considered in the prior art (i.e., the screen), thus enabling the reproduction of more uniform image colors.

Note that the screen 10 described above is of a reflective type, but it could equally well be of a transparent type. If the screen is of a transparent type, a sensor that scans the screen directly could be used as the colored-light sensor.

Similarly, the present invention can also be applied to presentations done by displaying images by a display means other than a projection means such as the previously described projector. Other than a liquid-crystal projector, a projector using a digital micromirror device (DMD), a cathode ray tube (CRT), a plasma display panel (PDP), a field emission display (FED) device, an electroluminescence (EL) device, or a direct-vision type of liquid crystal display device could be used as such a display means.

Note that DMD is a trademark registered to Texas Instruments Inc. of the USA.

It should be obvious that the present invention would also be effective when displaying images in applications that are not presentations, such as in meetings, for medical treatment, in the design or fashion world, in business activities, and in education, as well as for general-purpose image displays such as movies, TV, video, and games.

In some cases, the A/D conversion section 440 is not necessary when the input signal (R1, G1, B1) is in digital form, and the D/A conversion section is also not necessary when the output signal (R6, G6, B6) is digital form. This can be done as necessary in accordance with the input devices and output devices that are used.

Note that the functions of the previously described image processing section of the projector 20 could be implemented by a simple image display device (such as the projector 20), or they could be implemented by being distributed between a plurality of processing devices (such as processing that is distributed between the projector 20 and a PC).

In above embodiment, information in xyY (or Yxy) form is used as color information comprising brightness information, but it could equally well be in another format such as Lab, Luv, or LCh.

The above described environmental information could also be values that express color and brightness in a form such as xyY, but it could also be color and brightness correction amounts in a form such as $\Delta x \Delta y \Delta Y$.

In addition, the embodiment described above related to application to a front-projection type of projector, but the present invention can equally well be applied to a rear-projection type of projector.

What is claimed is:

1. An environment-compliant image display system which corrects an image based on environmental information expressing a visual environment in an area in which the image is displayed, and displays the image, the environment-compliant image display system comprising:

means for storing brightness correction information for correcting brightness of the image, based on the environmental information, and color correction information for correcting color of the image, based on the environmental information; and correction means for correcting image information for displaying the image, based on the environmental information, the brightness correction information, and the color correction information, wherein the brightness correction information comprises a one-dimensional look-up table, and wherein the color correction information comprises a three-dimensional look-up table.

2. The environment-compliant image display system as defined by claim 1, wherein the one-dimensional look-up table comprises at least one of a gamma table and a color balance table, and wherein the three-dimensional look-up table comprises at least one of a color gamut correction table and a color temperature correction table.

3. The environment-compliant image display system as defined by claim 1, wherein the correction means comprises means for collecting a plurality of types of environmental information that is input thereto all together, and corrects the image information based on the collected environmental information.

4. The environment-compliant image display system as defined by claim 1,
wherein the correction means modifies a predetermined correction coefficient that is used correction of the image information, based on the environmental information.

5. The environment-compliant image display system as defined by claim 1, further comprising:
visual environment detection means for measuring at least one of the color value, gamma, and color temperature of an image that is displayed in the image-displayed area.

6. The environment-compliant image display system as defined by claim 1,
wherein the image-displayed area is an area on a screen.

7. The environment-compliant image display system as defined by claim 6, further comprising:
means for displaying an image that guides to input a type of the screen; and
means for inputting the input type of the screen as at least part of the environmental information.

8. An environment-compliant image display system which corrects an image based on environmental information expressing a visual environment in an area in which the image is displayed, and displays the image, the environment-compliant image display system comprising:
a storage section which stores brightness correction information for correcting brightness of the image, based on the environmental information, and color correction information for correcting color of the image, based on the environmental information; and
a correction section which corrects image information for displaying the image, based on the environmental information, the brightness correction information, and the color correction information, wherein the brightness correction information comprises a one-dimensional look-up table, and wherein the color correction information comprises a three-dimensional look-up table.

9. A program embodied on an information storage medium or in a carrier wave which corrects an image based on environmental information expressing a visual environment in an area in which the image is displayed, and displays the image, the program being for a computer to realize:
means for a predetermined storage area to store brightness correction information for correcting brightness of the image, based on the environmental information, and color correction information for correcting color of the image, based on the environmental information; and
correction means for correcting image information for displaying the image, based on the environmental information, the brightness correction information, and the color correction information, wherein the brightness correction information comprises a one-dimensional look-up table, and wherein the color correction information comprises a three-dimensional look-up table.

10. The program as defined by claim 9,
wherein the one-dimensional look-up table comprises at least one of a gamma table and a color balance table, and
wherein the three-dimensional look-up table comprises at least one of a color gamut correction table and a color temperature correction table.

11. The program as defined by claim 9,
wherein the correction means comprises means for collecting a plurality of types of environmental information that is input thereto all together, and corrects the image information based on the collected environmental information.

12. The program as defined by claim 9,
wherein the correction means modifies a predetermined correction coefficient that is used in a correction of the image information, based on the environmental information.

13. The program as defined by claim 9,
wherein the environmental information is information from visual environment detection means for measuring at least one of the color value, gamma, and color temperature of an image that is displayed in the image-displayed area.

14. The program as defined by claim 9,
wherein the image-displayed area is an area on a screen.

15. The program as defined by claim 14, for a computer to realize:
means for a display means to display an image that guides to input a type of the screen; and
means for an input means to input the input type of the screen as at least part of the environmental information.

16. The environment-compliant image display system as defined by claim 9,
wherein the image-displayed area is an area on a screen.

17. The environment-compliant image display system as defined by claim 16, further comprising:
means for displaying an image that guides to input a type of the screen; and
means for inputting the input type of the screen as at least part of the environmental information.

* * * * *